Dec. 25, 1945.   J. GREGG   2,391,564
SHOE AND OUTSOLE THEREFOR AND METHODS OF MAKING THE SAME
Filed Sept. 29, 1944   2 Sheets-Sheet 1
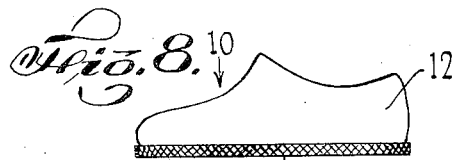
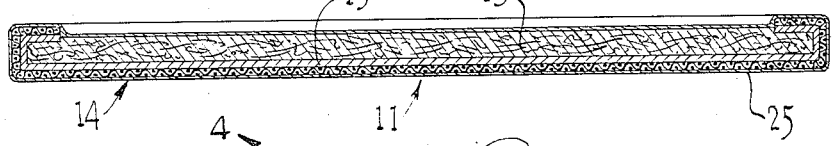
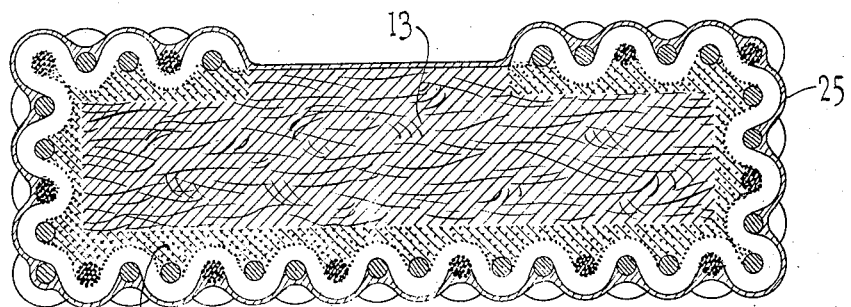
INVENTOR.
JON GREGG
BY
J. B. Felshin
ATTORNEY

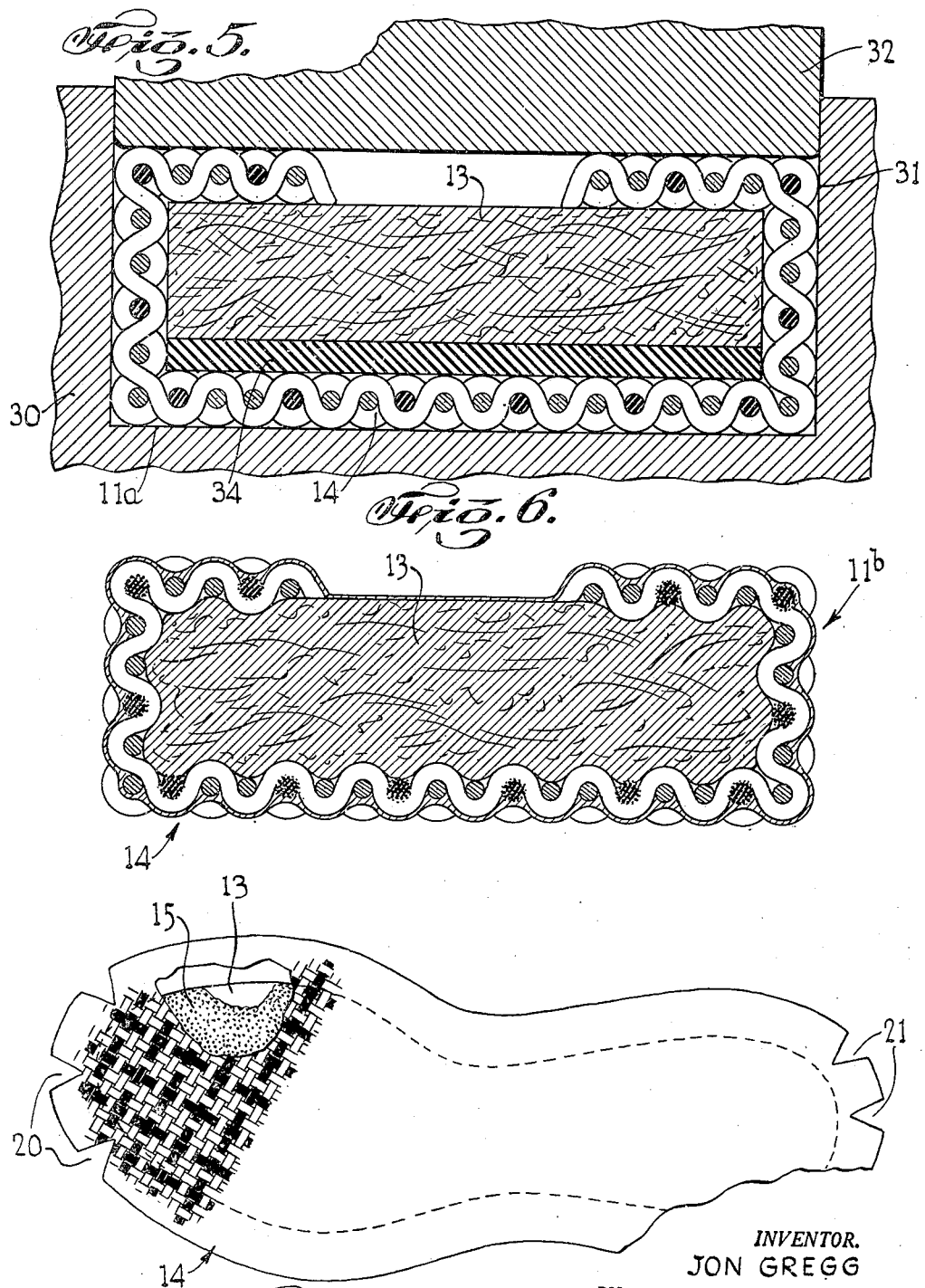

Patented Dec. 25, 1945

2,391,564

UNITED STATES PATENT OFFICE 2,391,564

SHOE AND OUTSOLE THEREFOR AND METHOD OF MAKING THE SAME

Jon Gregg, New Hope, Pa.

Application September 29, 1944, Serial No. 556,396

3 Claims. (Cl. 36—30)

This invention relates to shoes and outsoles therefor and methods of making the same.

An object of this invention is to provide a fabric, either woven, knitted or braided in such a way that certain yarns therein are of thermoplastic and/or thermosetting material, or made of uncured or semi-cured rubber, whereas other yarns in the same fabric are of animal, vegetable, mineral or synthetic origin. Such a fabric can be combined with other similarly constructed fabrics, or with fibrous, porous or absorbent material by the use of heat, pressure, cements, solvents or by vulcanization so as to unite the combined material.

Another object of this invention is to provide an improved process for making a sole of the character described comprising a platform made of fibrous material, and a covering therefor made of fabric having thermoplastic and/or thermosetting strands interwoven or interknitted with strands of fibrous material.

A further object of this invention is to provide a highly improved process of making a sole of the character described consisting in wrapping the bottom and side edges of a sole shaped pad or platform of fibrous porous or absorbent material with a fabric covering of knitted or woven material having some strands of thermoplastic material, and then curing said strands to cause the strands to flow into and unite with the platform.

Yet another object of this invention is to provide an improved process of the character described in which the fabric is coated on its inner surface with uncured or semi-cured thermoplastic or moldable material prior to wrapping the fabric around the platform.

Yet a further object of this invention is to provide an improved process of the character described comprising placing on a sheet of fabric woven or knitted or braided with strands of uncured, thermoplastic or moldable material, a slab or strip of uncured rubber or thermoplastic or thermosetting material, calendering the two together, and laying on said slab or strip at platform of fibrous material, then wrapping the fabric around the edges of the platform and placing the sole in a mold preferably under heat and pressure to cause the thermoplastic material to flow and unite with said platform.

Still a further object of this invention is to provide a shoe of the character described comprising a sole having a platform of fibrous material covered by fabric having both strands of thermoplastic material and strands of fibrous material and an upper attached to the sole.

Yet another object of this invention is to provide a strong, rugged and durable sole which shall be comfortable to use, which may be easily attached to an upper in making a shoe, or slipper, and which shall yet be relatively inexpensive to manufacture, and practical and efficient to a high degree.

Other objects of this invention will in part be obvious and in part hereinafter pointed out.

The invention accordingly consists in the combination of steps, features of construction, combinations of elements, and arrangement of parts which will be exemplified in the method and construction hereinafter described, and of which the scope of application will be indicated in the following claims.

In the accompanying drawings, in which is shown one of the various possible illustrative embodiments of this invention, Fig. 1 is a top plan view of a sole embodying the invention;

Fig. 2 is a cross-sectional view taken on line 2—2 of Fig. 1;

Fig. 3 is a bottom plan view of the sole shown in Fig. 1;

Fig. 4 is an enlarged cross-sectional view taken on line 4—4 of Fig. 3;

Fig. 5 is a transverse cross-sectional view of a sole in a mold, illustrating another form of the invention;

Fig. 6 is a cross-sectional view of a sole made in accordance with a modified process embodying the invention;

Fig. 7 is a bottom plan view of a piece of fabric woven with strands of moldable material and coated with a coating of thermoplastic material and employed in the process embodying the invention; and Fig. 8 is a side elevational view of a shoe made in accordance with the present invention.

Referring now in detail to the drawings, 10 designates a shoe embodying the invention. The same comprises a sole 11 made in accordance with the improved process described hereinafter and 12 designates an upper attached thereto.

The sole 11 comprises a platform 13 made of fibrous, absorbent or porous material. The same is cut to the outline of the desired sole (though somewhat smaller), and has flat parallel top and bottom surfaces, or it may be wedge shaped. The block or platform 13 may be made of hair, felt, jute padding, cotton padding, compressed paper, paper pulp, or any other suitable porous, fibrous or absorbent material. It is preferably compressible and somewhat resilient and flexible to produce a comfortable shoe. Covering the platform 13 is a covering member 14 made of either woven, knitted or braided fabric. The fabric of which the covering is made is preferably knitted or woven or braided with strands of uncured rubber, synthetic resin, acetate, or other thermoplastic, thermosetting, or moldable material.

As shown in the drawings, for the purpose of illustration, every third strand in both the warp and weft is a strand of uncured rubber or other thermoplastic material. Other suitable fabric construction may be employed. The moldable strands are woven, knitted or braided with threads or strands of animal, vegetable, mineral or synthetic fibers.

In making the sole, the inner surface of the fabric of which the covering is made is coated by coating 15, likewise of uncured rubber or thermoplastic and/or thermosetting material. The coated fabric is wrapped around the platform so as to cover the bottom and edges thereof and to fold over the top surface of the platform as shown in Fig. 2 of the drawings.

The fabric sheet 14 is preferably formed with cutouts 20 and 21 at the ends thereof to permit folding over of the fabric over the top of the platform. The covered platform is then placed in a mold and the moldable material may be cured by heat and pressure thereby causing the moldable material to flow and unite with the platform, thereby producing a unitary, highly efficient sole. The union may also be accomplished by the use of solvents, plasticizers, pressure alone, or heat alone. Such a sole may be readily cemented to an upper 12, and the laying of the upper is facilitated by the rubber strands in the fabric 14. The bottom and sides of the sole may be covered by a coating or layer 25 of water-proof material if desired.

It will be noted that the rubber coating 15 will flow during the molding or curing process into the interstices of the fabric 14 as well as into the interstices of the fibrous material 13. Furthermore, during the vulcanizing or curing process the thermoplastic material in the fabric 14 will fuse with the thermoplastic material of coating 15 so as to produce a highly desirable sole. The fibrous strands in the fabric may be woven cotton and is preferably woven with a loose weave. The cotton yarn is preferably loosely twisted to permit the rubber to penetrate into the fabric.

In Fig. 5 of the drawings there is shown a mold 30 having a mold opening 31 in which is pressed a plunger 32. In the mold 31 is a sole 11a embodying the invention and illustrating a modification. The sole 11a is similar to the sole 11 except that in the coating 15 is replaced by a slab 34 of uncured rubber or other thermoplastic or moldable material. The strip or slab 34 is cut to the shape of the platform 13 and the latter is superimposed over the slab 34. During the molding process, which is preferably carried out under heat and pressure, the rubber or other thermoplastic yarn in the fabric 14 will flow into the platform 13. The slab 34 will also flow and will therefore fuse with the rubber strands in the fabric 14 and will also flow into the platform 13 and unite with the fibrous strands in said fabric.

In Fig. 6 there is shown a sole 11b similar to sole 11 except that the coating 15 is entirely omitted. In this case the moldable, thermosetting, thermoplastic or rubber strands in the fabric 14 will flow to unite the fabric with the platform 13.

It will be understood that the fabric 11 may have many other uses than that shown in the drawings or described above. Several sheets of said fabric may be combined together, or a sheet may be attached to any other porous, fibrous or absorbent material.

It will thus be seen that there is provided a device and method in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A process of the character described, consisting in wrapping a piece of textile fabric having strands of moldable material, and coated with a coating of moldable material, about a block of fibrous material, with the coated side of the fabric against the block, then causing the moldable material to flow and fuse, whereby to unite the fabric with the block.

2. A process of making an outsole, consisting in pressing onto a piece of fabric having strands of moldable material and strands of fibrous material, a layer of moldable material having substantially the shape of a sole, then placing on said layer a platform made of fibrous material, wrapping the fabric around the side edges and part of the upper surface of the platform, and then causing the moldable material to flow and fuse, whereby to unite the fabric with the platform.

3. An outsole comprising an inner sole-shaped member, said inner member being made of porous material, a layer of textile fabric enclosing the bottom and peripheral edge of said inner member, said fabric including strands of fibrous material and strands of thermoset material penetrating into said inner member and into the fibrous strands of said textile fabric, and an outer coating of waterproofing material on said sole.

JON GREGG.